United States Patent [19]

Foxworthy et al.

[11] 4,014,741
[45] Mar. 29, 1977

[54] NUCLEAR CONTROL ROD POSITION INDICATING ASSEMBLY

[75] Inventors: Milton Kearney Foxworthy; John Timothy Huston; Burton Davis Ziels, all of Lancaster, Ohio

[73] Assignee: Diamond Power Specialty Corporation, Lancaster, Ohio

[22] Filed: July 11, 1975

[21] Appl. No.: 594,999

[52] U.S. Cl. .......................... 176/19 EC; 176/36 R; 335/206
[51] Int. Cl.² .......................................... G21C 7/00
[58] Field of Search ................. 176/19, 19 EC, 36; 340/177, 179, 188; 73/313; 324/28 R; 335/206

[56] References Cited

UNITED STATES PATENTS 3,183,496  5/1965  Goldstein .................. 340/188 R
3,656,074  4/1972  Bevilacqua et al. ............. 176/19 R

*Primary Examiner*—Samuel Feinberg
*Attorney, Agent, or Firm*—Vytas R. Matas; Joseph M. Maguire

[57] ABSTRACT

The position of a control rod located within a nuclear reactor is sensed by an externally located position indicating assembly. The assembly includes a reed switch voltage divider circuit in which the individual reed switches are actuated in a 2-3-2-3 sequence by the magnetic field of a permanent magnet mounted to the control rod. The assembly averages the signals from the actuated reed switches and after amplifying the averaged signal transmits it to an indicator which provides an indication of control rod position. The voltage divider circuit may have a pair of parallel connected voltage dividers with individual sets of reed switches respectively connected thereto to provide a redundant circuit which will operate with one of the voltage dividers selectively disconnected.

9 Claims, 3 Drawing Figures

NUCLEAR CONTROL ROD POSITION INDICATING ASSEMBLY

BACKGROUND OF THE INVENTION

1. Field of the Invention

The present invention relates to position indicating circuits generally and particularly to position indicating circuits for indicating the position of a nuclear reactor control rod.

2. Description of the Prior Art

Position indicating systems are generally known for indicating the position of a control rod in a nuclear reactor. Such known systems employ a permanent magnet mounted to the control rod drive mechanism to be movable internally of the reactor along with the control rod. A reed switch circuit is usually located externally of the nuclear reactor along a path corresponding with the operating length of the control rod and hence along the operating length of travel of the permanent magnet. As the control rod moves, different reed switches of the circuit are progressively actuated by the magnetic flux of the permanent magnet and yield appropriate output signals whose magnitudes are indicative of the position of the control rod. These output signals are used to limit the nuclear reactor power level under certain conditions.

Should any of the reed switches fail to be actuated, a faulty output signal results from the circuit and the operation of the nuclear reactor may be impaired. Should a reed switch fail to close in response to the magnetic flux of the magnet a zero output signal results from the circuit which signal is usually indicative of a fully inserted control rod position. Such a control rod position would falsely signal a group asymmetry condition that could require possible reactor power runback which is time consuming and expensive. On the other hand should a reed switch fail to open when the magnetic flux is removed the circuit would now provide two output signals, the signal from the failed open reed switch and the signal from the newly actuated reed switch. These two signals would combine to provide an output signal indicative of a completely different control rod position in the reactor than actual. This may also result in a false group asymmetry condition and cause a power runback. In such prior art systems once the fault was discovered the entire circuit had to be replaced entailing costly shut down and replacement.

SUMMARY OF THE INVENTION

The present invention solves the forementioned problems of the prior art systems by providing a position indicating system for a control rod which provides an accurate output signal indicative of true control rod position even when a reed switch fails in either the open or closed condition. The circuit of the present invention also provides redundancy of measurement and allows the faulty part of the circuit to be disconnected without greatly impairing measuring accuracy and without requiring a replacement of the entire circuit.

One embodiment of the present invention provides a voltage divider bridge along which a series of read switches are connected to provide output signals when actuated. The reed switches are spaced to be actuated in a 2-3-2-3 sequence by a movable permanent magnet mounted to the control rod drive mechanism. The 2-3-2-3 sequence means that as the control rod moves the permanent magnet actuates 2 reed switches, then 3 reed switches, then 2 reed switches, etc. The output signals from the actuated reed switches are conducted along individual electrical channels to an averaging circuit which then averages the signals and establishes an output signal indicative of control rod position. Thus, if a reed switch fails in the open position it is not averaged and the remaining actuated reed switch or switches provide an accurate control rod position indication. Should the reed switch fail in the closed position the averaging circuit compensates for the erroneous signal by averaging the faulty signal with at least two accurate signals to minimizes the effect of the faulty signal. The present circuit also provides for a disconnection of the faulty signal channel and a feedback of the averaged signal along the disconnected channel to remove the faulty signal from the averaging circuit and compensate for any sneak current in the voltage divider.

Another embodiment of the present invention provides a pair of parallel connected voltage divider circuits having a set of reed switches connected to each of the voltage dividers. The reed switches of each set are alternately connected between their appropriate voltage divider and two pairs of output channels. Thus in the system switches are actuated in a 2-3-2-3 sequence. The output signals are averaged in an averaging circuit and the benefits of the previously discussed embodiment are also found in the present embodiment. The present embodiment has a switching circuit which disconnects one of the voltage dividers if it is found that a faulty reed switch is connected thereto.

Both of the above embodiments could also have a redundant action reed switch connected across each of the disclosed main reed switches to eliminate the error produced by a failed open main reed switch. The redundant reed switches would be physically close to the main reed switches and would be simultaneously actuated with the main reed switches to provide a by-pass path for the output signal across the failed open reed switch along a path provided by the actuation of the redundant reed switch.

In view of the foregoing it is seen that one aspect of the present invention is to provide a position indicating circuit which will establish an accurate output signal even if a read switch should fail in the open or closed condition.

Another aspect of the present invention is to provide a position indicating circuit wherein the error causing reed switch circuit may be disconnected from the circuit without significantly impairing the performance of the assembly.

Yet another aspect of the present invention is to provide a circuit having redundant reed switches which will provide an output signal across a failed open reed switch.

These and other aspects of the present invention will be more fully understood from the following description of the preferred embodiments considered with the drawings.

DESCRIPTION OF THE PREFERRED EMBODIMENTS

Figure 1:
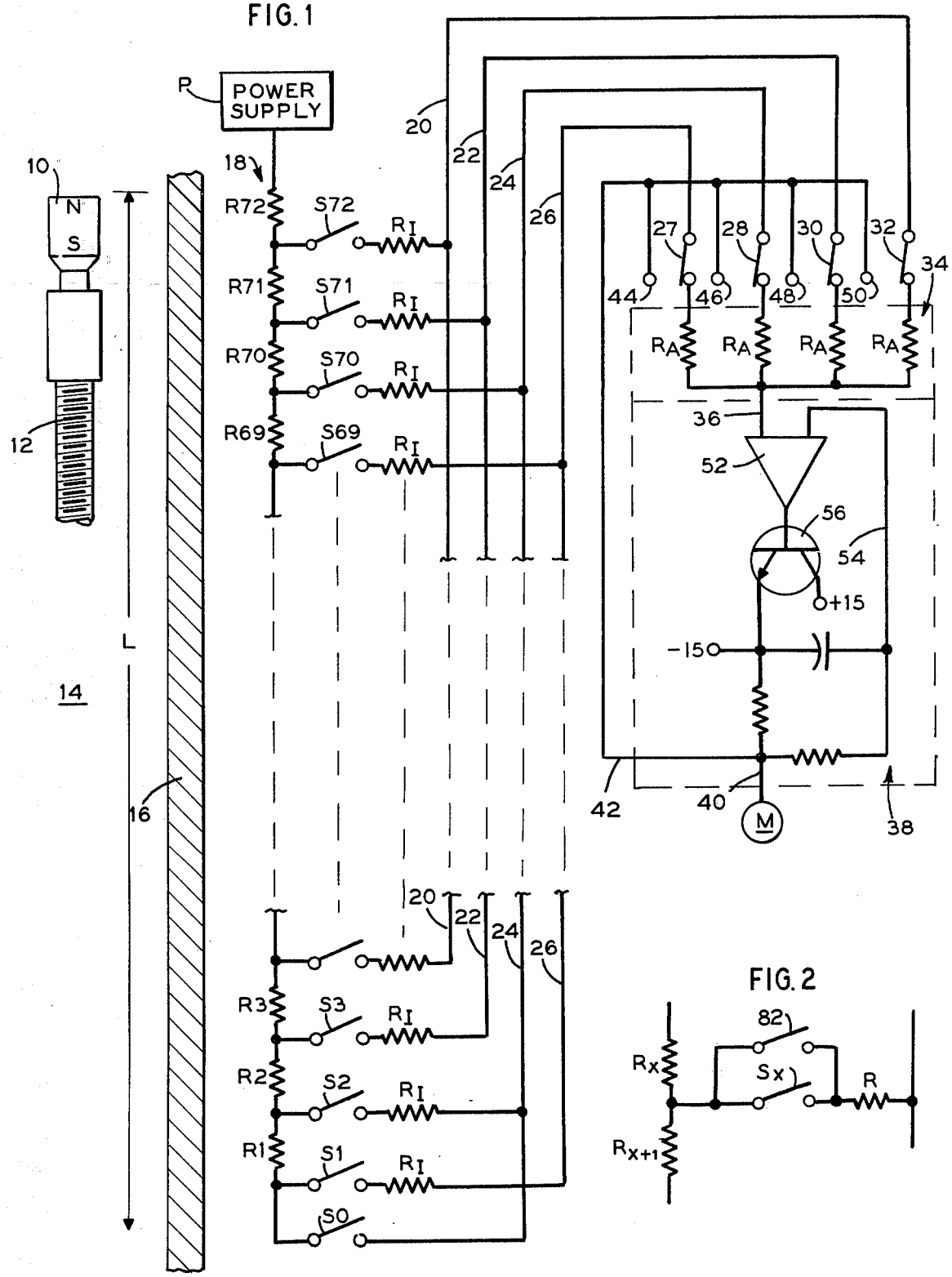
FIG. 1 is a schematic representation of one position indicating circuit of the present invention.

Referring now to the drawings, FIG. 1 has a permanent magnet 10 connected to a leadscrew extension 12 of a control rod (not shown) to be movable inside a nuclear reactor 14 with the control rod (not shown). The control rod is moved by any well known drive means such as hydraulic jacks, roller nuts, pistons, etc. along a predetermined length L defining positions between full insertion of the control rod in the reactor 14 and full withdrawal of the control rod from the reactor 14.

The permanent magnet 10 sets up a field of localized magnetic flux which extends through a non-magnetic wall 16 of the nuclear reactor 14 and actuates at least two reed switches in the area of the permanent magnet 10. The sealed integrity of the reactor 14 is thereby maintained. Mounted externally along the predetermined length L of the reactor 14 along a 2 inch spacing are a series of 72 magnetic reed switches $S_1$ through $S_{72}$. The reed switches $S_1$ through $S_{72}$ are in close proximity to the wall 16 and are spaced to allow a sequential actuation of 2-3-2-3 reed switches as the permanent magnet moves along the length L. This means that when the permanent magnet 10 is located between two adjacent reed switches S both of the reed switches S will be actuated to close and when the permanent magnet is directly opposite one reed switch S that reed switch S and the reed switches S on opposite sides of that reed switch S will be actuated to close. Thus at least two reed switches S will always be closed by any positioning of the permanent magnet 10.

The reed switches $S_1$ through $S_{72}$ are connected between seventy-two substantially identical resistors $R_1$ through $R_{72}$ which are series connected to form a seventy-two step voltage divider circuit 18. The voltage divider circuit 18 is connected to a 5 volt D.C. power supply P at one end and fractions of this supply voltage P may be conducted to an output by closing appropriate reed switches $S_1$ through $S_{72}$. Every fourth reed switch $S_1$ through $S_{72}$ is electrically connected through an isolating resistor $R_I$ to one of four output channels 20, 22, 24, and 26. The spaced connection of the reed switches $S_1$ through $S_{72}$ prevents the actuation of two reed switches S which are connected to one channel since never more than three adjacent reed switches S are actuated by the permanent magnet 10.

The four channels 20, 22, 24, and 26 are connected respectively through switches 27, 28, 30, 32 to an averaging circuit 34 having four parallel connected resistors $R_A$ of substantially identical resistance. In operation, each of the channels 20, 22, 24 and 26 having a reed switch S output signal established thereon add their voltages through the well known averaging circuit's 34 effective resistance to establish the averaged output signal along a line 36 to an amplifying circuit 38. The amplifying circuit 38 transmits an amplified output signal along line 40 to a meter M which is calibrated to provide a visible indication of the position of the control rod in the reactor 14.

The amplified output signal from the amplifying circuit 38 is also transmitted along a line 42 to contact points 44, 46, 48, and 50 to which the switches 27, 28, 30, and 32 are individually selectively moved to feedback the output signal from the amplifier 52 back along a desired channel 20, 22, 24, or 26 to compensate for any reed switch S which has failed in a closed position. More specifically should any of the switches S fail closed a continuous output signal will be established to the appropriate channel 20, 22, 24 or 26 irrespective of the properly actuated reed switches S responding to the magnetic flux of the magnet 10. This erroneous signal may be detected by checking if the outputs from each channel are properly stepped as determined by the sequential actuation of adjacent reed switches S. This checking may be done at the inputs to the averaging circuit 34. The improperly stepped channel 20, 22, 24, or 26 may then be removed from the averaging circuit 34 by manually switching the appropriate switch 27, 28, 30, or 32 to its appropriate contact point 44, 46, 48, or 50. This switching will disconnect that channel 20, 22, 24, or 26 from the averaging circuit 34 and apply the averaged amplified output back along the disconnected channel to the voltage divider circuit 18. This feedback of the output to the faulty channel neutralizes the effect of the faulty reed switch S on the other properly actuated reed switches S by eliminating sneak circuit currents in that channel caused by the faulty reed switch S.

The amplifying circuit 38 uses two stage amplification. The first stage includes an operational amplifier 52 having an input connected to the output of the averaging circuit 34 through the line 36. The gain of the amplifier 52 is set by the resistance of a feedback loop 54. The output of the operational amplifier 52 is connected to a transistor amplifier 56 which provides a power gain to the system. Clearly a single amplifier could just as easily be used or no amplifier at all if the load impedance is high enough.

From the foregoing it is seen that due to the overlapping actuation of the reed switches S and the averaging ability of the circuit to average the reed switch output signals a single faulty reed switch S will not substantially harm the performance of this circuit. Further the faulty channel is easily detected and disconnected from the averaging of the true signals to obviate any need for immediately fixing or replacing the entire circuit.

Figure 3:
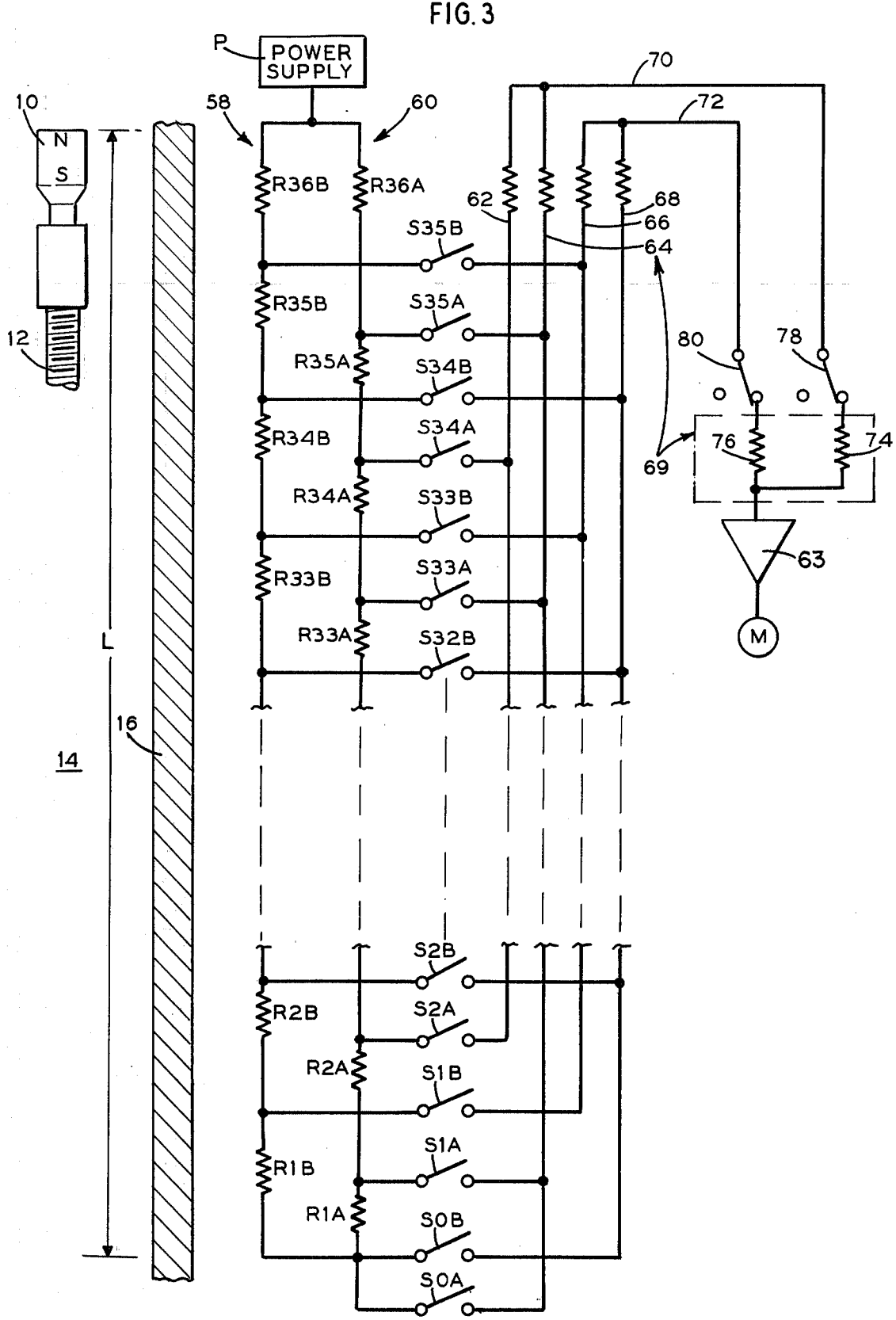
FIG. 3 is a schematic representation of an alternate position indicating circuit of the present invention.

Turning now to FIG. 3 the basic concepts of the foregoing circuit may be adapted in an alternate embodiment. The elements internal of the reactor 14 remain the same and are identically numbered as in FIG. 1. Externally of the wall 16 two sets of 36 reed switches $S_{1A}$ through $S_{35A}$ and $S_{1B}$ through $S_{35B}$ are mounted along the predetermined length L of control rod travel. The set of reed switches $S_{1A}$ through $S_{35A}$ is mounted on a 4 inch spacing as is the set $S_{1B}$ through $S_{35B}$ with set $S_B$ being offset 2 inches above set $S_A$.

The field of the moving permanent magnet 10 extends beyond the wall 16 at right angles to the leadscrew 12 axis and the field actuates the magnetic reed switches $S_A$ and $S_B$ located proximate to the magnet 10 in a 2-3-2-3 sequence. As the leadscrew 12 travels, reed switches $S_A$ and $S_B$ within the magnet's field close to complete an electrical circuit to a pair of isolated voltage divider strings 58 and 60 that may extend along the length L of the wall 16. The position of the magnet 10 along the length L of the wall 16 determines the magnitudes of the output voltages from the pair of voltage dividers 58 and 60. These output voltages are averaged, as before, and buffered by an amplifier 62 and displayed on the position indication meter M as a percent of leadscrew 12 travel from the fully inserted position in the reactor 14.

The ends of the reed switches $S_A$ and $S_B$ opposite the voltage dividers 58 and 60 are alternately connected to 4 output channels or signal lines 62, 64, 66 and 68. These channels are selectively averaged by an averaging circuit 69 formed in external output signal lines 70 and 72. Additional reed switches may be included which indicate in-limit, 0% travel, 25% travel, 50% travel, 75% travel, 100% travel and out-limit. The reed switches $S_A$ and $S_B$ are most conveniently mounted on printed circuit boards housed in a fiberglass tube parallel to the wall 16 of the reactor 14 which contains the leadscrew 12 and the permanent magnet 10.

In operation, reed switches within the field of the magnet 10 are actuated in an overlapping sequence of 2-3-2-3 as the magnet travels. Actuating a reed switch $S_A$ or $S_B$ couples the voltage level at that point on the voltage dividers 58 or 60 to the appropriate output signal line 62, 64, 66 or 68. The overlapping actuation of the reed switches $S_A$ and $S_B$ alternately couples voltages to the four output signal lines 62, 64, 66 and 68 which signals are averaged and combined to form the 2 external output signal lines 70 and 72. The voltages present on these 2 external output signal lines 70 and 72 are averaged at the input of the amplifier 63 by two parallel connected resistors 74 and 76 of substantially identical resistance.

A power supply P is connected to the voltage dividers 58 and 60 and provides the voltage dividers 58 and 60 with 5.184V D.C. to form two redundant voltage dividers 58 and 60. These voltage dividers 58 and 60, although connected to a common power supply P are otherwise totally isolated, preventing any failure in one circuit from affecting its complement.

Should a reed switch $S_A$ or $S_B$ fail in either of the voltage dividers 58 or 60, one half of the redundant divider circuit may be easily removed by selectively switching switches 78 and 80. These switches 78, 80 will open circuit output lines 70 or 72 and remove the set of reed switches $S_A$ or $S_B$ having the faulty reed switch from the averaging circuit 69. The indication will now be handled by the remaining single voltage divider 58 or 60 which will maintain an output signal to either channels 62 and 64 or 66 and 68 and still produce an accurate output to the amplifier 63.

Figure 2:
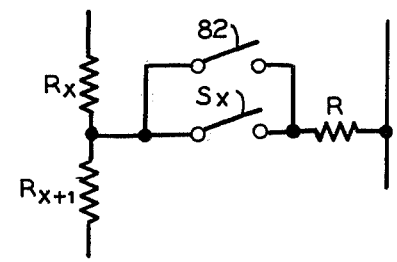
FIG. 2 is a schematic representation of a redundancy reed switch connected across a main reed switch of a circuit of the present invention.

Turning now to FIG. 2 it will be seen that either of the foregoing embodiments or any of the prior art position indicators using reed switches may be improved by adding a redundancy reed switch 82. This redundancy reed switch 82 is parallel connected across each of the main circuit reed switches $S_X$. Both reed switches 82 and $S_X$ are mounted in close physical contact to ensure that the magnetic flux of the magnet 10 would actuate both reed switches. Should the main reed switch $S_X$ fail in the open position the redundancy reed switch 82 would still close under the influence of the magnet 10 and provide the output signal that the failed reed switch $S_X$ is unable to provide.

Certain modifications and additions will be apparent upon a reading of this specification. It will be understood that such modifications and additions were deleted for the sake of conciseness and readability but are properly included in the scope of the appended claims.

What we claim is:

1. A position indicator circuit comprising:
   a voltage divider circuit;
   a series of reed switches connected to different points of said voltage divider circuit;
   four output lines sequentially connected to every fourth one of said series of reed switches for receiving output signals from said voltage divider circuit through said series of reed switches; and
   indicating means connected to said output lines for indicating the output of said divider circuit.

2. A position indicating assembly for establishing an output signal indicative of the position of a control rod located in a nuclear reactor comprising:
   a permanent magnet mounted to the control rod to be movable a predetermined distance therewith;
   a first voltage divider circuit having a plurality of series connected resistors;
   a second voltage divider circuit parallel connected with said first voltage divider circuit;
   output means for establishing an output signal from said voltage dividers indicative of control rod position;
   a first set of reed switches mounted externally of the reactor to be linearly aligned along the predetermined distance of movement of said permanent magnet, each of said set of reed switches being connected to different resistors of said first voltage divider circuit and to said output means; and
   a second set of reed switches alternately mounted with said first set of reed switches wherein said second set of reed switches is connected to said second voltage divider circuit.

3. A position indicating assembly for establishing an output signal indicative of the position of a control rod located in a nuclear reactor comprising:
   a permanent magnet mounted to the control rod to be movable a predetermined distance therewith;
   a first voltage divider circuit having a plurality of series connected resistors;
   output means for averaging at least a pair of input signals from said voltage divider;
   a first set of reed switches mounted externally of the reactor along the predetermined distance of movement of said permanent magnet, each of said set of reed switches being connected to different resistors of said first voltage divider circuit and to said output means, said set of reed switches being spaced along the predetermined distance to insure that at least two reed switches will always be actuated by the movement of said permanent magnet; and
   said output means including four output lines with each of said output lines having every fourth reed switch connected thereto.

4. A position indicating assembly as set forth in claim 3 wherein said output means also includes:
   an averaging circuit having a substantially identical resistor connected in each of said four output lines with one end of each resistor connected to a common output point; and
   amplifying means connected to said common output point for increasing the signal level established at said common output points.

5. A position indicating assembly as set forth in claim 4 including switching means for selectively applying the increased signal level established by said amplifying means to one of said output lines.

6. A position indicating assembly as set forth in claim 5 wherein said switching means includes a switch mounted in each of said output lines having a first position connecting the output line to the input of said amplifying means and a second position connecting the output line to the output of said amplifying means.

7. A position indicating assembly for establishing an output signal indicative of the position of a control rod located in a nuclear reactor comprising:
  a permanent magnet mounted to the control rod to be movable a predetermined distance therewith; a first voltage divider circuit having a plurality of series connected resistors;
  output means for averaging at least a pair of input signals from said voltage divider; a first set of reed switches mounted externally of the reactor along the predetermined distance of movement of said permanent magnet, each of said set of reed switches being connected to different resistors of said first voltage divider circuit and to said output means, said set of reed switches being spaced along the predetermined distance to insure that at least two reed switches will always be actuated by the movement of said permanent magnet;
  a second voltage divider circuit parallel connected with said first voltage divider circuit; and
  a second set of reed switches alternately mounted with said first set of reed switches and wherein said second set of reed switches is connected to said second voltage divider circuit.

8. A position indicating assembly as set forth in claim 7 wherein said output means includes four output lines forming two pairs of parallel connected lines with said first set of reed switches being connected to said first pair of parallel lines and said second set of reed switches being connected to said second pair of parallel lines.

9. A position indicating assembly as set forth in claim 8 including an amplifier and a pair of averaging resistors separately connected to said pair of output lines at one end and to a common input of said amplifier at the other end.

* * * * *